3,329,598
PHOTOCHEMICAL METHODS FOR MAKING
SULFOPIVALIC ACID ANHYDRIDE
Peter Borner, Kamen, Germany, assignor to
Schering AG., Berlin, Germany
No Drawing. Filed Oct. 28, 1963, Ser. No. 319,524
Claims priority, application Germany, Nov. 2, 1962,
Sch 32,277
5 Claims. (Cl. 204—158)

The present invention relates to methods for making cyclic sulfopivalic acid anhydride.

The reaction of aliphatic hydrocarbons with sulfur dioxide and chlorine under irradiation with actinic light is known in the prior art to lead in a smooth reaction to the formation of alkyl sulfochlorides. On the other hand, it has been said that the sulfochlorination of oxygen-containing organic compounds proceeds altogether unfavorably because of the preferential introduction of chlorine into the molecule with the exclusion of sulfur. Heretofore there has been no description of the sulfochlorination of carboxylic acids with sulfur dioxide and chlorine under irradiation with actinic light with the production of definite and uniform products containing a sulfo group. Hence, it is surprising that the reaction of pivalic acid with sulfur dioxide and chlorine according to the invention leads in a smooth reaction to the almost exclusive formation of the cyclic anhydride of sulfopivalic acid.

According to the invention, pivalic acid is reacted with sulfur dioxide and chlorine under irradiation with actinic light in the temperature range from about −40° to about 100° C., particularly between about −20° and about 40° C., under pressure if desired. At temperatures below the melting point of pivalic acid at 35° C., the reaction is suitably performed in the presence of a solvent which is inert to, or reacts only slightly with, sulfur dioxide and chlorine under the conditions of the reaction. In order to avoid as far as possible the formation of by-products, it is particularly advantageous to carry out the reaction in such an inert solvent, for example carbon tetrachloride, until partial reaction of the initial pivalic acid to an extent of about 40 to 70 percent has occurred.

If the reaction is carried out in the particularly suitable temperature range of from −20° to 40° C., a post-heating of the reaction mixture at temperatures of from about 40° to about 140° C. is recommended for completion of dehydrochlorination and the achievement of higher yields of pure sulfopivalic acid anhydride. Apparently in the reaction pivalic acid is first sulfochlorinated, and the sulfochloride is only very slowly converted at low temperatures into the cyclic anhydride of sulfopivalic acid by the splitting off of hydrogen chloride.

If, under certain conditions, product precipitates from the reaction solution during the reaction, it is easily dissolved at slightly raised temperatures by post-heating of the reaction mixture. On cooling, the cyclic anhydride of sulfopivalic acid precipitates from the solution in the form of colorless crystals and can easily be recovered by filtration. The filtrate obtained in this manner contains, in addition to the solvent employed, predominantly unreacted pivalic acid with small amounts of sulfuryl chloride and of chloropivalic acid. The solution, optionally with the addition of an amount of pivalic acid corresponding with that employed in the first reaction, can again be reacted with sulfur dioxide and chlorine to form further sulfopivalic acid anhydride. Alternatively, the unreacted pivalic acid and solvent contained in the filtrate can be separated by distillation from other accompanying substances present in small amount, and recovered.

For the sulfochlorination of pivalic acid, sulfur dioxide and chlorine are advantageously introduced into the reaction medium as a finely divided gas stream in which the mole ratio of sulfur dioxide to chlorine can be chosen within a wide range between 0.5 and 20, preferably however between 1 and 3. Also, the use of pressure to raise the saturation concentration of the gases in the solution is possible. As solvents for the reaction, materials are preferred which, in the temperature range used, do not react, or react only negligibly, with sulfur dioxide and chlorine. Suitable solvents are hydrocarbons and halohydrocarbons, both aliphatic and aromatic, for example, such as carbon tetrachloride, hexachloroethane, and benzene. Other suitable solvent materials are well known to and will be self-evident to the skilled organic chemist.

For initiation and maintenance of the reaction, irradiation with light of wavelengths from 2000 A. to 7000 A., preferably from 3000 A. to 5000 A., is suitably employed.

The process can be carried out continuously by continuous removal and separation of the end product and unreacted starting material from the reaction mixture, with return of the unreacted pivalic acid to the reaction zone.

The cyclic anhydride of pivalic acid is very versatile, particularly as an intermediate product in pharmaceutical chemistry and in the preparation of plastics. In particular, this material can be used for the cold hardening of epoxy resins. The epoxy resins of commerce, such as the bis-glycidyl ether of bisphenol A, for example, only react with carboxylic acid anhydrides, such as phthalic acid anhydride and hexahydrophthalic acid anhydride, to give hardening times of use for practical purpose when the temperature is above 80° C. For complete hardening, a heating of the components of the mixture to 100°–200° C. is necessary. If sulfopivalic acid anhydride is used in place of the carboxylic acid anhydrides for hardening, or if a mixture of the carboxylic anhydrides and sulfopivalic acid anhydride is used, hardening takes place within several hours with autogeneration of heat.

A better understanding of the invention, and of its many advantages, can be had by referring to the following example, given by way of illustration.

*Example*

750 gm. of pivalic acid were dissolved in 375 gm. of carbon tetrachloride in a cylindrical reaction vessel equipped with a condenser, gas-inlet stirrer, thermometer, and a Hanau No. 313 quartz immersion lamp (3660 A.). Over the course of five hours, a total of 75 liters of gaseous chlorine and 100 liters of sulfur dioxide (the pressure of both gases was 780 mm. Hg at 20° C.) was introduced into the solution, which had been cooled to 5° C., under irradiation with ultra-violet light. Subsequently, nitrogen was introduced for one half hour for removal of dissolved sulfur dioxide and hydrogen chloride, and the solution was then heated for three hours at 70°–80° C. Hereupon, a very strong evolution of hydrogen chloride occurred. Solids precipitated toward the end of the sulfochlorination reaction dissolved in the reaction mixture. On cooling of the soltuion to 0°–10° C., the colorless cyclic anhydride of sulfopivalic acid crystallized. The very hygroscopic crystals were vacuum filtered with exclusion of moisture. 252 gm. of product were obtained. M.P.: 62°–68° C.; saponification number; 680; sulfur content: 19.16%; chlorine content: 0.10%. After addition of petroleum ether to the mother liquor, another 28.2 gm. of product precipitated.

By distillative removal of the added petroleum ether and carbon tetrachloride, the unreacted pivalic acid, which contains only small amounts of chloropivalic acid, can be recovered.

For purification, both crystalline products (280 gm. altogether) were combined and dissolved in 700 ml. of carbon tetrachloride at boiling temperatures. The solution was filtered while hot and with the exclusion of moisture for separation of the undissolved solids. On cooling, 242 gm. of pure sulfopivalic acid anhydride having a melting point of 62°–64° C. crystallized from the filtrate.

When the reaction of the example is performed in a temperature range above the melting point of pivalic acid without the addition of a solvent, the sulfopivalic acid anhydride product is obtained in smaller yield, since by-products such as chloropivalic acid are formed in greater amounts at the higher temperatures.

Although specific embodiments have been shown and described, it is to be understood that they are illustrative, and are not to be construed as limiting on the scope and spirit of the invention.

What is claimed is:

1. The method of making cyclic sulfopivalic anhydride

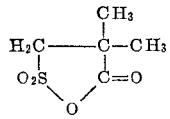

which comprises reacting pivalic acid with sulfur dioxide and chlorine at temperatures between about −40° C. and 100° C. while irradiating the reaction mixture with light of wavelengths between 2000 A. and 7000 A.

2. The method as in claim 1 wherein said reaction mixture comprises an inert solvent.

3. The method as in claim 1 wherein the reaction mixture is irradiated with light of wavelengths between 3000 A. an 5000 A.

4. The method as in claim 1 wherein the reaction takes place at temperatures between about −20° C. and about 40° C.

5. The method as in claim 4 wherein higher yields of the anhydride product are promoted by subsequently heating the reaction mixture at temperatures between about 40° C. and 140° C.

References Cited
UNITED STATES PATENTS

| | | | |
|---|---|---|---|
| 2,346,569 | 4/1944 | Fox | 204—158 |
| 2,528,320 | 10/1950 | Roberts et al. | 204—162 |
| 2,749,365 | 6/1956 | Dazzi | 260—543 |

JOHN H. MACK, *Primary Examiner.*

HOWARD S. WILLIAMS, *Examiner.*